United States Patent
Kim et al.

(10) Patent No.: US 8,743,306 B2
(45) Date of Patent: Jun. 3, 2014

(54) LIQUID CRYSTAL DISPLAY DEVICE AND METHOD OF MANUFACTURING THE SAME

(75) Inventors: Yong Joo Kim, Cheonan-si (KR); Doo In Nam, Cheonan-si (KR); Jang Yeop Shim, Cheonan-si (KR); Kyung Gook Kwak, Seoul (KR); Seung Kyu Lee, Asan-si (KR)

(73) Assignee: Samsung Display Co., Ltd., Giheung-Gu, Yongin, Gyeonggi-Do (KR)

( * ) Notice: Subject to any disclaimer, the term of this patent is extended or adjusted under 35 U.S.C. 154(b) by 348 days.

(21) Appl. No.: 13/178,910

(22) Filed: Jul. 8, 2011

(65) Prior Publication Data

US 2012/0120358 A1 May 17, 2012

(30) Foreign Application Priority Data

Nov. 17, 2010 (KR) .................... 10-2010-0114553

(51) Int. Cl.
*G02F 1/1343* (2006.01)

(52) U.S. Cl.
USPC .................... 349/39; 349/33; 349/38; 349/54

(58) Field of Classification Search
USPC .......................... 349/33, 38, 39, 54
See application file for complete search history.

(56) References Cited

U.S. PATENT DOCUMENTS

| | | | |
|---|---|---|---|
| 5,854,723 A | 12/1998 | Suzuki | |
| 5,936,797 A | 8/1999 | Suzuki | |
| 5,956,202 A | 9/1999 | Suzuki | |
| 6,057,903 A | 5/2000 | Colgan et al. | |
| 6,177,918 B1 | 1/2001 | Colgan et al. | |
| 6,831,710 B2 * | 12/2004 | den Boer | 349/48 |
| 8,289,285 B2 * | 10/2012 | Jang et al. | 345/173 |
| 2008/0027845 A1 | 1/2008 | Dreyer et al. | |
| 2008/0129898 A1 | 6/2008 | Moon | |

FOREIGN PATENT DOCUMENTS

| | | |
|---|---|---|
| CN | 1167976 A | 12/1997 |
| CN | 1246638 A | 3/2000 |
| EP | 1 921 537 A2 | 5/2008 |
| JP | 2000-105670 A | 4/2000 |
| JP | 3526418 | 2/2004 |
| JP | 2009-086184 | 4/2009 |
| KR | 2000-0016923 A | 3/2000 |
| KR | 10-2002-0019671 | 3/2002 |
| KR | 10-0354594 | 9/2002 |
| KR | 10-2006-0128564 | 12/2006 |
| KR | 10-2008-0042294 | 5/2008 |
| KR | 10-2008-0098876 | 11/2008 |
| TW | 438988 | 6/2001 |

OTHER PUBLICATIONS

US 6,028,735, Feb. 22, 2000, Katsuhiro Suzuki (withdrawn).

* cited by examiner

*Primary Examiner* — Jennifer Doan
(74) *Attorney, Agent, or Firm* — Roberts F. Bushnell, Esq.

(57) ABSTRACT

A liquid crystal display device and a method of manufacturing the same. The liquid crystal display device includes a plurality of pixel cells on a substrate and a common voltage line. The common voltage line provides a common voltage to the pixel cells, and includes first to third interconnection patterns which are sequentially stacked over the substrate. Each of the pixel cells includes a storage capacitor which includes a lower electrode, and an upper electrode over the lower electrode. The second interconnection pattern includes the same material as a material of the upper electrode, and is formed in the same process as a process of the upper electrode.

12 Claims, 11 Drawing Sheets

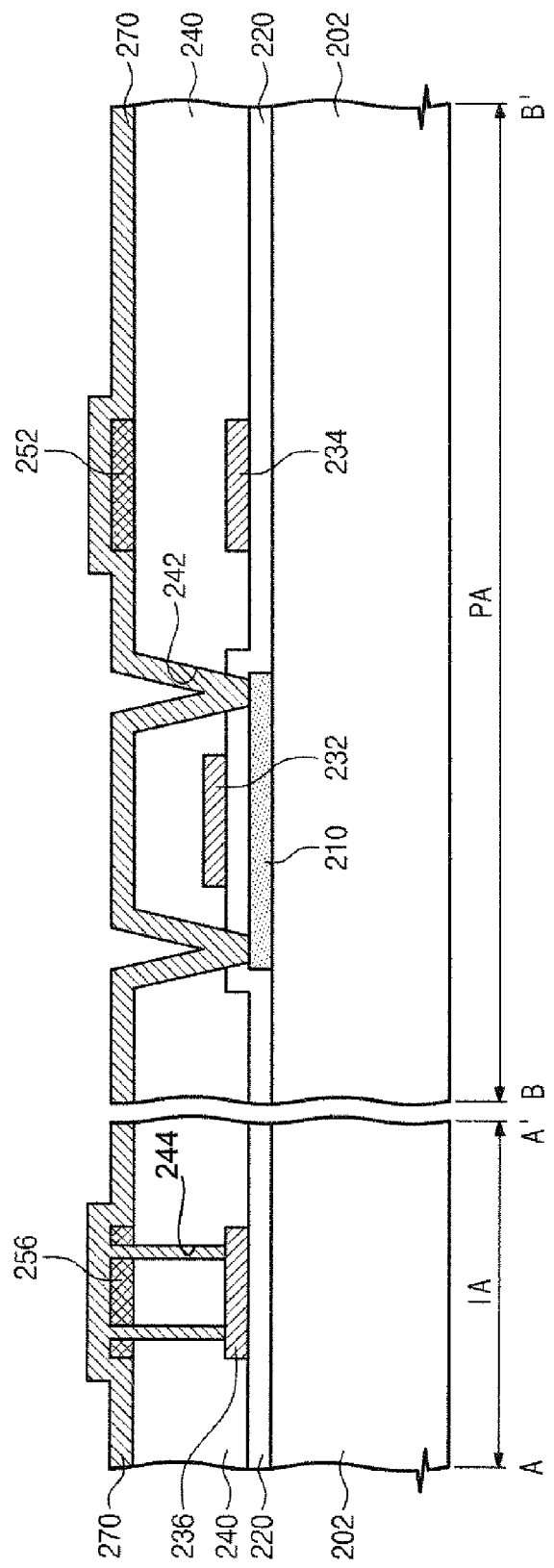

LIQUID CRYSTAL DISPLAY DEVICE AND METHOD OF MANUFACTURING THE SAME

CLAIM OF PRIORITY

This application makes reference to, incorporates the same herein, and claims all benefits accruing under 35 U.S.C §119 from an application earlier filed in the Korean Intellectual Property Office on 17 Nov. 2010, and there duly assigned Serial No. 10-2010-0114553 by that Office.

BACKGROUND OF THE INVENTION

1. Field of the Invention

The present disclosure herein relates to a liquid crystal display device (LCD) and a method of manufacturing the same.

2. Description of the Related Art

In LCDs, generally, a thin film transistor substrate on which electric field generation electrodes are alternately formed at certain distances and a color filter substrate are disposed to face each other, wherein the color filter substrate faces a surface of the thin film transistor substrate on which the electrodes are disposed. Liquid crystal is injected between the thin film transistor substrate and the color filter substrate. An electric field is generated by respectively applying different voltages to the electric field generation electrodes, and drives the liquid crystal. Light transmittance is changed in proportion to the twisted angle of the liquid crystal, and an image is displayed by the light transmittance. That is, the LCDs are devices that realize images in the above-described scheme.

Due to ultra thinning, lightening, high reliability and low consumption power characteristics, the LCDs are widely being applied to personal computers, televisions and mobile information devices such as portable personal information terminals and portable phones.

SUMMARY OF THE INVENTION

The present disclosure provides a liquid crystal display device having high reliability and a method of manufacturing the same.

The present disclosure also provides a liquid crystal display device having high efficiency and a method of manufacturing the same.

Embodiments of the inventive concept provide a liquid crystal display device including: a plurality of pixel cells on a substrate; and a common voltage line providing a common voltage to the pixel cells, and including first to third interconnection patterns which are sequentially stacked over the substrate, wherein: each of the pixel cells includes a storage capacitor which includes a lower electrode, and an upper electrode over the lower electrode, and the second interconnection pattern includes the same material as a material of the upper electrode and is provided in the same process as a process of the upper electrode.

In some embodiments, the second interconnection pattern may be disposed at the same level as a level of the upper electrode.

In other embodiments, the each pixel cell may further include a transistor, the transistor may include a semiconductor pattern on the substrate, a gate electrode overlapping with the semiconductor pattern, a gate dielectric between the semiconductor pattern and the gate electrode, and a source electrode and a drain electrode which contact the semiconductor pattern of both sides of the gate electrode, and the first interconnection pattern may include the same material as a material of the gate electrode, and is provided in the same process.

In still other embodiments, the first interconnection pattern and the gate electrode may be disposed at different levels.

In even other embodiments, the first interconnection pattern and the gate electrode may be disposed at the same level.

In yet other embodiments, the third interconnection pattern, the source electrode and the drain electrode may be provided in the same process as a process of the third interconnection pattern.

In further embodiments, the first interconnection pattern may include the same material as a material of the lower electrode, and be provided in the same process as a process of the lower electrode.

In still further embodiments, the first interconnection pattern and the lower electrode may be disposed at the same level.

In even further embodiments, the second and third interconnection patterns may be directly contacted, and the liquid crystal display device may further include a dielectric layer between the first and second interconnection patterns.

In yet further embodiments, the common voltage line may further include a contact plug which connects the first and second interconnection patterns through the dielectric layer and the second interconnection pattern.

In much further embodiments, the first and second interconnection patterns may include the same material, and the first and second interconnection patterns may include a different material from a material of the third interconnection pattern.

In still much further embodiments, the common voltage line may be disposed on an edge portion of the substrate and surrounds the pixel cells.

In other embodiments of the inventive concept, a method of manufacturing a liquid crystal display device includes: preparing a substrate which includes an interconnection area and a pixel area; forming a first interconnection pattern in the interconnection area, and a lower electrode in the pixel area; forming a dielectric layer which covers the first interconnection pattern and the lower electrode; forming a first conductive layer on the dielectric layer; and patterning the first conductive layer to form a second interconnection pattern overlapping with the first interconnection pattern and an upper electrode overlapping with the lower electrode.

In some embodiments, the forming of a first interconnection pattern and a lower electrode may include: forming an overlying conductive layer over the substrate; and patterning the overlying conductive layer.

In other embodiments, the first conductive layer and the overlying conductive layers may include the same material.

In still other embodiments, the patterning of the overlying conductive layer may further include forming a gate electrode separated from the lower electrode, in the pixel area.

In even other embodiments, the method may further include: forming a semiconductor pattern which overlaps with the gate electrode, the gate electrode and the semiconductor pattern being covered with the dielectric layer; patterning the dielectric layer to form pixel area contact holes which expose the semiconductor pattern of both sides of the gate electrode; forming a second conductive layer on the dielectric layer; and patterning the second conductive layer to form a third interconnection pattern overlapping with the second interconnection pattern, and a source electrode and a drain electrode in the pixel area contact holes, the source and drain electrode being contact with the exposed semiconductor pattern.

In yet other embodiments, the dielectric layer may be formed between the first and second interconnection patterns, and the patterning of the dielectric layer may include forming an interconnection area contact hole which exposes the first interconnection pattern, through the second interconnection pattern and the dielectric layer.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIGS. 5A to 5C are cross-sectional views illustrating a method of manufacturing a common voltage line which is included in a liquid crystal display device according to the embodiment of the inventive concept of FIG. 4;

DETAILED DESCRIPTION OF THE INVENTION

Figure 1:
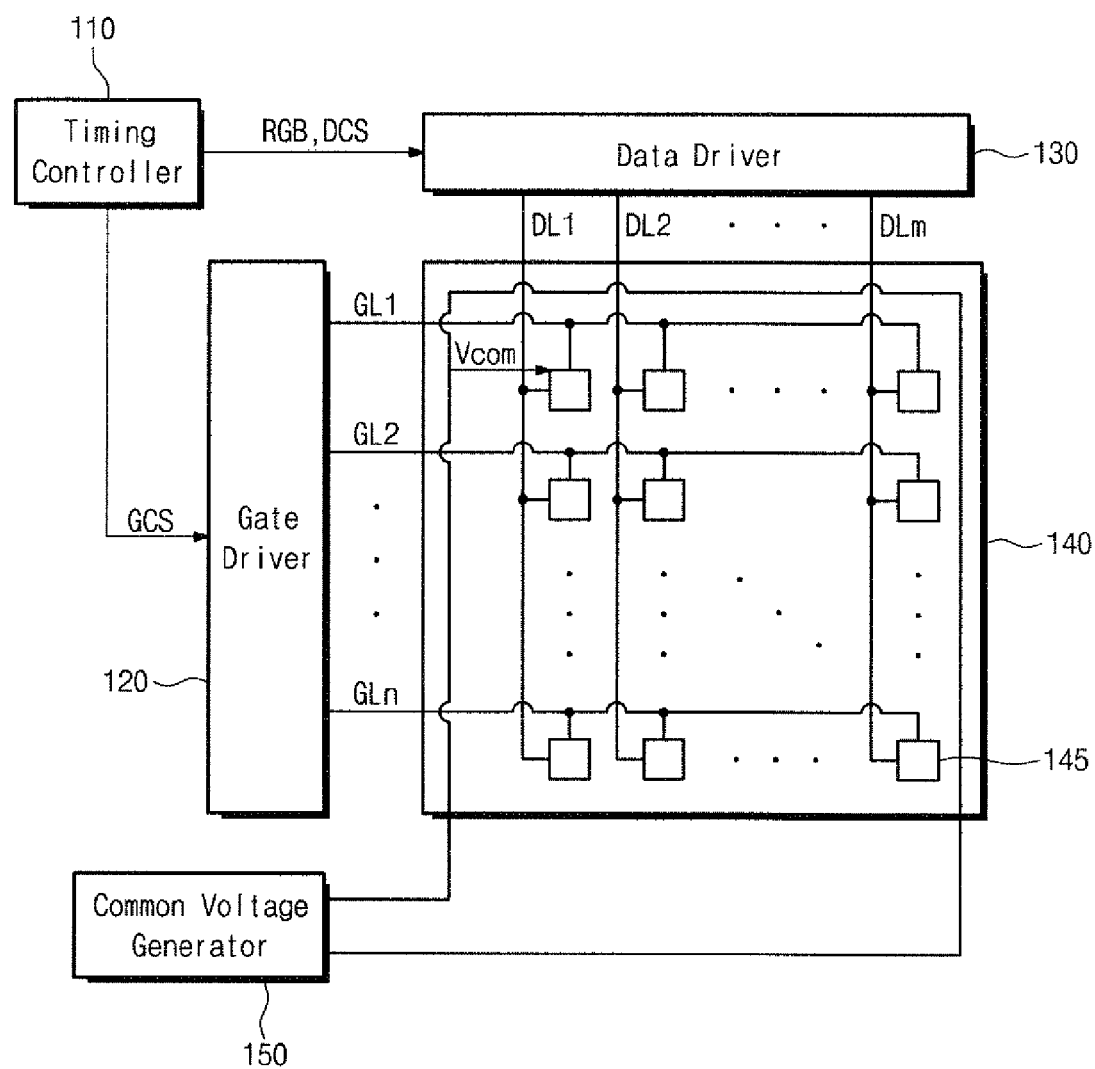
FIG. 1 is a block diagram illustrating a liquid crystal display device according to an embodiment of the inventive concept.

Exemplary embodiments of the inventive concept will be described below in more detail with reference to the accompanying drawings. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art.

In the specification, it will be understood that when an element such as a layer, film, region, or substrate is referred to as being "on" another element, it can be directly on the other element or intervening elements may also be present. In the figures, the dimensions of layers and regions are exaggerated for clarity of illustration. Also, though terms like a first, a second, and a third are used to describe various regions and layers in various embodiments of the present invention, the regions and the layers are not limited to these terms. These terms are used only to discriminate one region or layer from another region or layer. Therefore, a layer referred to as a first layer in one embodiment can be referred to as a second layer in another embodiment. An embodiment described and exemplified herein includes a complementary embodiment thereof. In the specification, the term 'and/or' is used as meaning in which the term includes at least one of preceding and succeeding elements. Like reference numerals refer to like elements throughout.

A liquid crystal display device according to embodiments of the inventive concept will be described below. FIG. 1 is a block diagram illustrating a liquid crystal display device according to an embodiment of the inventive concept.

Referring to FIG. 1, a liquid crystal display device according to an embodiment of the inventive concept may include a timing controller 110, a gate driver 120, a data driver 130, a common voltage generator 150, and a liquid crystal display panel 140.

The timing controller 110 may generate a gate control signal GCS and a data control signal DCS. The timing controller 110 may transfer the gate control signal GCS to the gate driver 120, and transfer the data control signal DCS to the data driver 130. The timing controller 110 may transfer pixel data signals RGB to the data driver 130.

The gate driver 120 may receive the gate control signal GCS, select any one of a plurality of gate lines GL1 to GLn, and apply a gate voltage to the selected gate line. The gate driver 120 may control timing of the gate voltage that is provided to the gate lines GL1 to GLn in response to the gate control signal GCS.

For example, the gate driver 120 may sequentially apply the gate voltage from the first gate line GL1 to the nth gate line GLn. Switching transistors, which are respectively included in pixel cells connected to the selected gate line receiving the gate voltage, may be turned on, but switching transistors, which are respectively included in pixel cells connected to unselected gate lines to which the gate voltage is not applied, may be turned off. Transistors that are respectively included in pixel cells connected to the same gate line may be simultaneously turned on or turned off. The gate driver 120 may be directly formed on a substrate in which the liquid crystal display panel 140 is formed.

The data driver 130 may receive pixel data signals RGB and the data control signal DCS. The data driver 130 may convert gray scale-converted pixel data signals RGB into analog voltages, and provide data output voltages to a plurality of data lines DL1 to DLm.

The liquid crystal display panel 140 may include a plurality of pixel cells 145. The liquid crystal display panel 140 and the pixel cells 145 will be described below with reference to FIG. 2.

Figure 2:
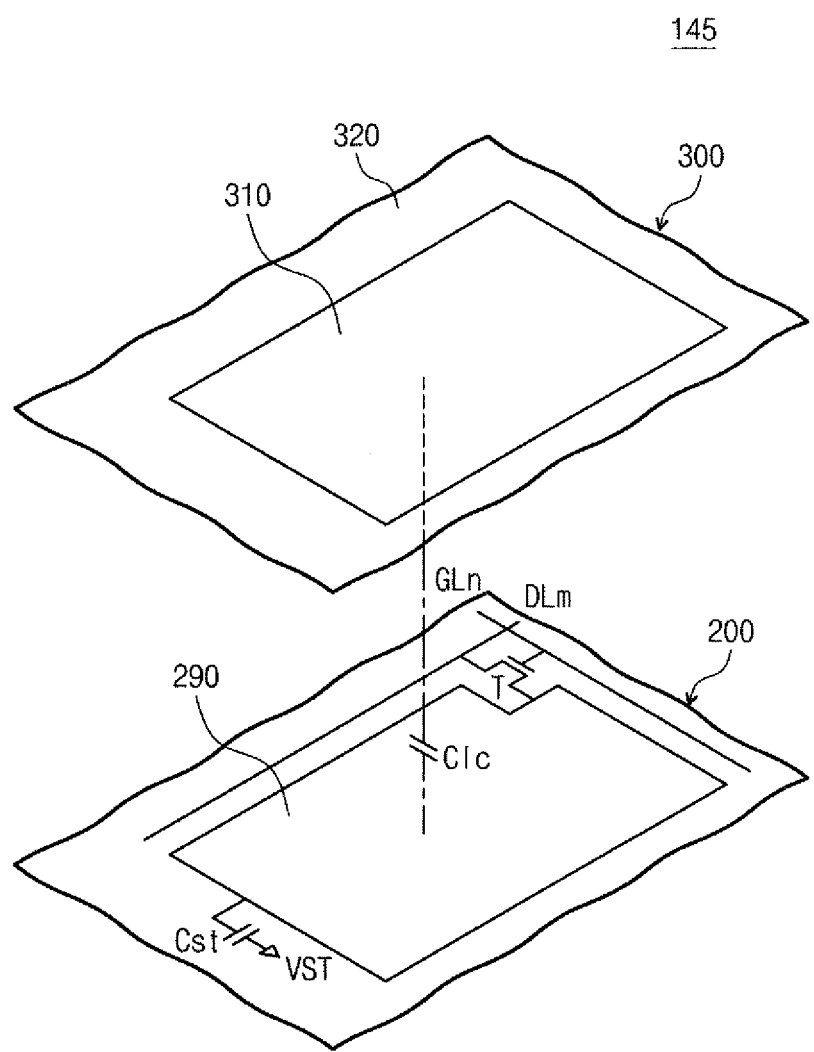
FIG. 2 is for describing a pixel cell included in a liquid crystal display panel according to an embodiment of the inventive concept, and is a view exemplarily illustrating a pixel cell of a liquid crystal display panel which is illustrated in FIG. 1.

FIG. 2 is for describing a pixel cell included in a liquid crystal display panel according to an embodiment of the inventive concept, and is a view exemplarily illustrating the pixel cell 145 of the liquid crystal display panel 140 which is illustrated in FIG. 1. For conciseness, FIG. 2 illustrates a pixel which is connected to the nth gate line GLn and the mth data line DLm.

Referring to FIGS. 1 and 2, the liquid crystal display panel 140 may include a first substrate structure 200 including the gate lines GL1 to GLn and the data lines DL1 to DLm, a second substrate structure 300 facing the first substrate structure 200, and a liquid crystal layer (not shown) that is formed between the first substrate structure 200 and the second substrate structure 300. The liquid crystal display panel 140 may include the pixel cells 145 that are connected to the gate lines GL1 to GLn and the data lines DL1 to DLm.

The gate lines GL1 to GLn may be extended in parallel in a first direction, and the data lines DL1 to DLm may be extended in parallel in a second direction vertical to the first direction.

Each of the pixel cells 145 may be connected to one gate line and one data line. A plurality of pixel cells 145 that are extended in the first direction may configure a row, and a plurality of pixel cells 145 that are extended in the second direction may configure a column. Pixel cells 145 included in the same row may be connected to the same gate line, and pixel cells 145 included in the same column may be connected to the same data line. The gate lines GL1 to GLn may be extended between adjacent rows, and the data lines DL1 to DLm may be extended between adjacent columns.

Each of the pixel cells 145 may include a transistor T connected to the data line DLm, a liquid crystal capacitor Clc connected to the transistor T, and a storage capacitor Cst connected to the transistor T.

For example, the control terminal of the transistor T may be connected to the nth gate line GLn, the input terminal of the transistor T may be connected to the mth data line DLm, and the output terminal of the transistor T may be connected to the liquid crystal capacitor Clc and the storage capacitor Cst. The liquid crystal capacitor Clc has a pixel electrode 290 of the first substrate structure 200 and a common electrode 310 of the second substrate structure 300 as two terminals, and a liquid crystal layer (not shown) between the pixel electrode 290 and the common electrode 310 may be formed to serve as dielectric. The pixel electrode 290 may be connected to the transistor T, and the common electrode 310 may be formed over the second substrate structure 300 to receive a common voltage Vcom.

The storage capacitor Cst may include a lower electrode included in the first substrate structure 200, an upper electrode that is disposed over the lower electrode and is connected to the pixel electrode 290, and an insulator between the lower electrode and the upper electrode. Herein, a storage voltage Vst having the same level as that of the common voltage Vcom may be applied to the lower electrode.

Each of the pixel cells 145 may display any one of red, green and blue. A color filter 320 for displaying any one of red, green and blue may be included in a partial area of the second substrate structure 300.

The liquid crystal layer between the pixel electrode 290 and the common electrode 310 may be driven by a difference between the common voltage Vcom applied to the common electrode 310 and a data output voltage that is output to the pixel electrode 290 of the liquid crystal capacitor Clc. Therefore, the gray scale values of the pixel cells 145 may be controlled.

The common voltage Vcom may be generated by the common voltage generator 150 and be provided to the pixel cells 145 through a common voltage line. The common voltage line may be disposed to surround the pixel cells 145. The common voltage line may include the same material as that of the upper electrode of the storage capacitor Cst. This will be described below with reference to FIGS. 3 and 4.

Figure 3:
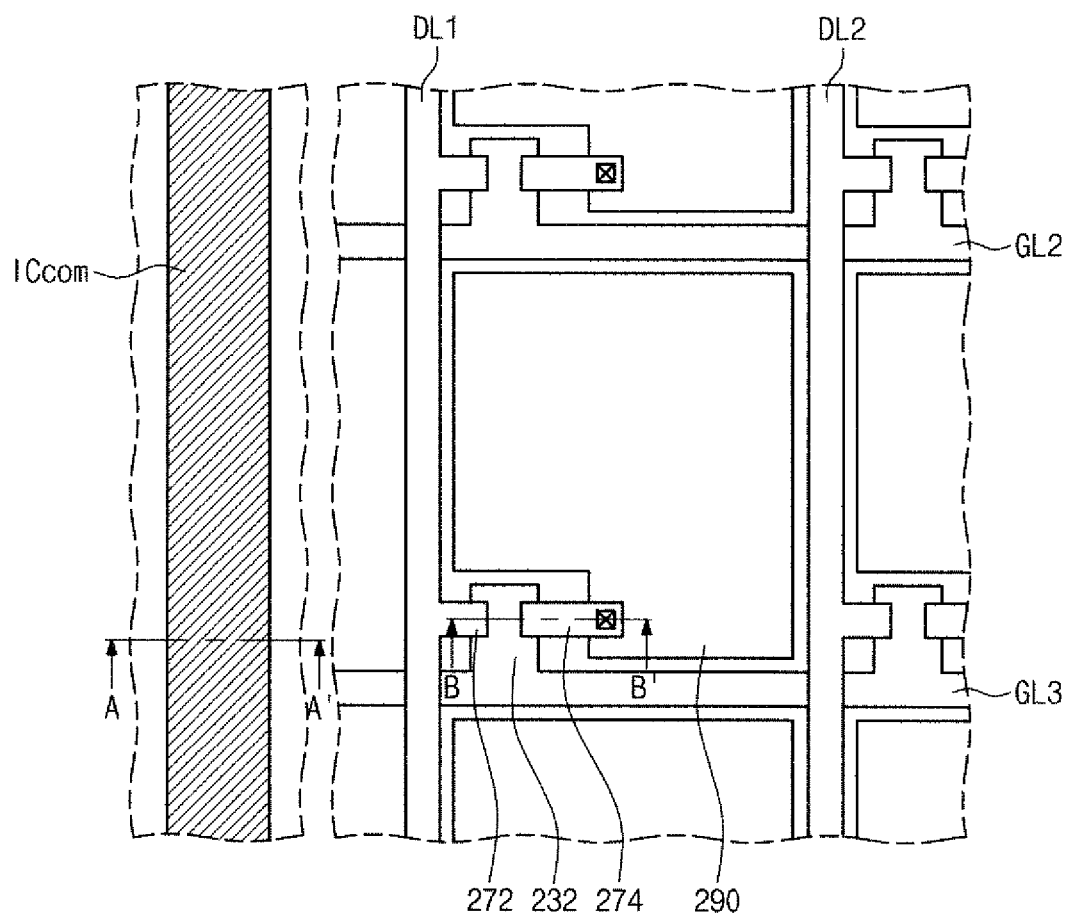
FIG. 3 is a view illustrating a common voltage line included in a liquid crystal display device according to an embodiment of the inventive concept.
Figure 4:
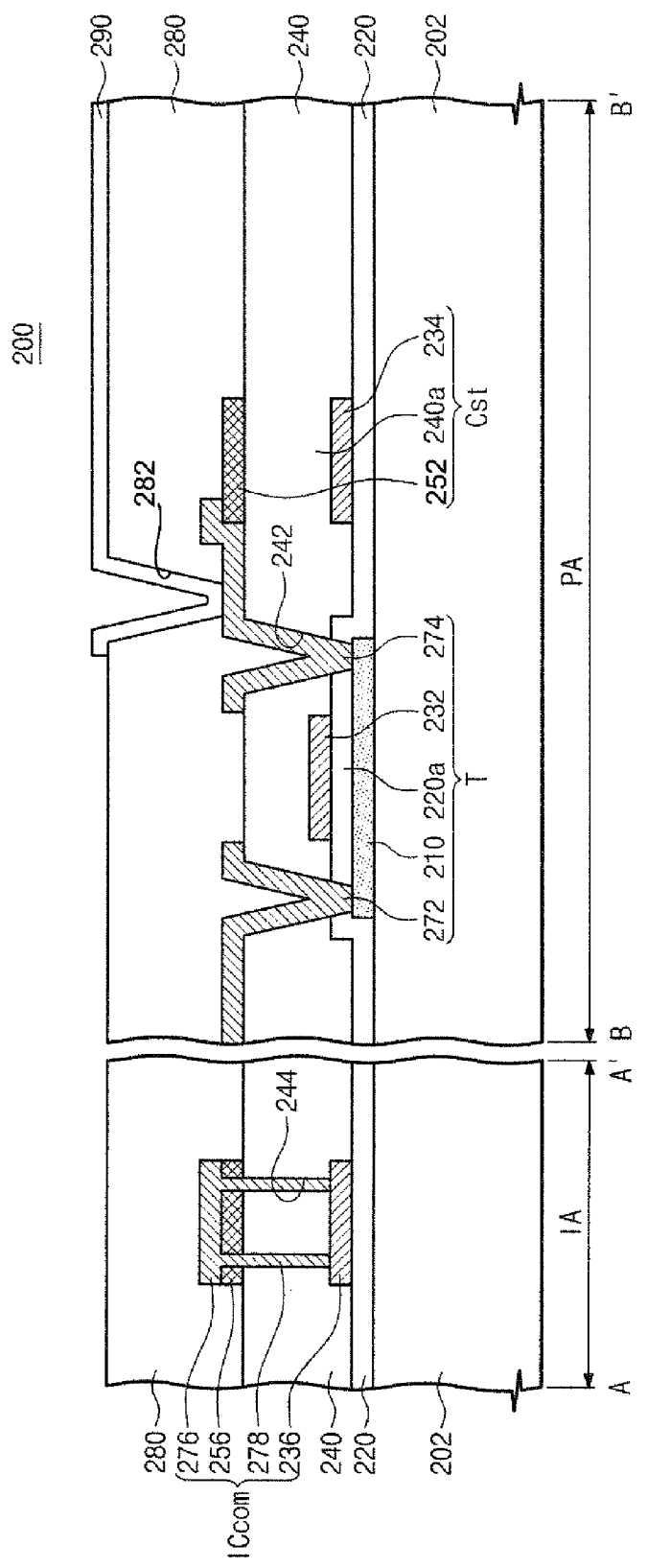
FIG. 4 is a view for describing a common voltage line included in a liquid crystal display device according to an embodiment of the inventive concept, and is a cross-sectional view taken along lines A-A' and B-B' of FIG. 3.

FIGS. 3 and 4 are for describing a common voltage line included in aliquid crystal display device according to an embodiment of the inventive concept. FIG. 3 is a view illustrating a portion of the first substrate structure 200 which is illustrated in FIG. 2. FIG. 4 is a cross-sectional view taken along lines A-A' and B-B' of FIG. 3.

Referring to FIGS. 3 and 4, prepared may be a substrate 202 including an interconnection area IA and a pixel area PA. The transistor T, the storage capacitor Cst and the pixel electrode 290 that are included in the each pixel cell 145 of FIG. 2 may be formed in the pixel area PA, and the common voltage line ICcom may be formed in the interconnection area IA.

The transistor T may include a semiconductor pattern 210 on the substrate 202, a gate electrode 232 over the semiconductor pattern 210, a gate dielectric 220a between the semiconductor pattern 210 and the gate electrode 232, a drain electrode 272, and a source electrode 274. Herein, the drain electrode 272 and the source electrode 274 may contact the semiconductor pattern 210 in both sides of the gate electrode 232.

The storage capacitor Cst may include a lower electrode 234 over the substrate 202, an upper electrode 252 over the lower electrode 234, and a capacitor dielectric layer 240a between the lower electrode 234 and the upper electrode 252.

The common voltage line ICcom may include first to third interconnection patterns 236, 256 and 276 that are sequentially stacked over the substrate 202, and contact plugs 278 connecting the first and second interconnection patterns 236 and 256.

The semiconductor pattern 210 may be formed on the substrate 202 in the pixel area PA. The semiconductor pattern 210 may include amorphous silicon or poly-crystal silicon. On the other hand, the semiconductor pattern 210 may include a compound semiconductor material.

An insulation layer 220 may be disposed over the substrate 202. The insulation layer 220 may cover the semiconductor pattern 210. The gate dielectric 220a may be a portion of the insulation layer 220 which is disposed between the gate electrode 232 and the semiconductor pattern 210. The insulation layer 220 may include any one of silicon oxide, silicon nitride or silicon oxynitride.

The gate electrode 232 and the lower electrode 234 may be disposed on the insulation layer 220 of the pixel area PA, and the first interconnection pattern 236 may be disposed on the insulation layer 220 of the interconnection area IA. The gate electrode 232 may be disposed to overlap with the semiconductor pattern 210. The gate electrode 232 may be a protruding portion where the gate lines GL2 and GL3, extended in the first direction, protrude in the second direction. The lower electrode 234 may be laterally separated from the gate electrode 232, and may be disposed not to overlap with the semiconductor pattern 210.

The gate electrode 232, the lower electrode 234 and the first interconnection pattern 236 may be formed of the same material. For example, the gate electrode 232, the lower electrode 234 and the first interconnection pattern 236 may include any one of molybdenum (Mo), aluminum (Al), silver (Au), copper (Cu), chromium (Cr), titanium (Ti) or tantalum (Ta). The gate electrode 232, the lower electrode 234 and the first interconnection pattern 236 may be provided in the same process. Therefore, the gate electrode 232, the lower electrode 234 and the first interconnection pattern 236 may have the same thickness. The lower electrode 234 and the first interconnection pattern 236 may be disposed at the substantially same level from the top of the substrate 202. The gate electrode 232 may be disposed at a higher level from the top of the substrate 202 than the lower electrode 234 and the first interconnection pattern 236.

A lower dielectric layer 240 may be disposed on the insulation layer 220, the gate electrode 232, the lower electrode 234 and the first interconnection pattern 236. The lower dielectric layer 240 and insulation layer 220 may include pixel area contact holes 242 exposing the semiconductor pattern 210 of both sides of the gate electrode 232. The capacitor dielectric layer 240a may be a portion of the lower dielectric layer 240 that is disposed between the lower electrode 234 and the upper electrode 252. The lower dielectric layer 240 may be formed as a single layer or a multi-layer. The lower dielectric layer 240 may include any one of silicon oxide, silicon nitride or silicon oxynitride.

The upper electrode 252 overlapping with the lower electrode 234 may be disposed on the lower dielectric layer 240 of the pixel area PA. The second interconnection pattern 256 overlapping with the first interconnection pattern 236 may be disposed on the lower dielectric layer 240 of the interconnection area IA. The upper electrode 252 and the second interconnection pattern 256 may be formed of the same material. In this case, the upper electrode 252 and the second interconnection pattern 256 may be formed of the same material as that of the lower electrode 234 and first interconnection pattern 236. The upper electrode 252 and the second interconnection pattern 256 may be provided in the same process. Therefore, the upper electrode 252 and the second interconnection pattern 256 may have the same thickness. The upper electrode 252 and the second interconnection pattern 256 may be disposed at the substantially same level from the top of the substrate 202.

The drain electrode 272 and the source electrode 274 may be formed in the pixel area contact holes 242 and contact the semiconductor pattern 210 that is exposed by the pixel area contact holes 242. An internal space surrounded by the drain electrode 272 and the source electrode 274 may be defined in the pixel area contact holes 242. The source electrode 274 may contact the upper electrode 252. The drain electrode 272 may be a protruding portion where the data lines DL1 and DL2, extended in the second direction, protrude in the first direction.

The third interconnection pattern 276 overlapping with the second interconnection pattern 256 may be formed of the same material as that of the drain and source electrodes 272 and 274. For example, the third interconnection pattern 276, the drain electrode 272 and the source electrode 274 may include at least one of Al, Mo, tungsten (W), vanadium (V), Cr, Ta or Ti. The third interconnection pattern 276, the drain electrode 272 and the source electrode 274 may be formed in a multi-layer. For example, the third interconnection pattern 276, the drain electrode 272 and the source electrode 274 may be formed in a multi-layer including Ti/Al/Ti. The third interconnection pattern 276, the drain electrode 272 and the source electrode 274 may be formed of a material different from that of the first and second interconnection patterns 236 and 256, that of the upper and lower electrodes 252 and 234 and that of the gate electrode 232.

The contact plug 278 may fill an interconnection area contact hole 244 for exposing the first interconnection pattern 236, through the second interconnection patterns 256 and the lower dielectric layer 240 between the first and second interconnection patterns 236 and 256. The contact plug 278 may electrically connect the first and second interconnection patterns 236 and 256. The contact plug 278 may be formed of the same material as that of the third interconnection pattern 276, drain electrode 272 and source electrode 274, and may be provided in the same process.

An upper dielectric layer 280 that covers the third interconnection pattern 276, the drain electrode 272, the source electrode 274 and the upper electrode 252 may be disposed on the lower dielectric layer 240. The upper dielectric layer 280 may fill an internal space in the pixel area contact holes 242. The upper dielectric layer 280 may include a contact hole 282 for exposing the source electrode 274. The upper dielectric layer 280 may be formed of an inorganic insulating material. For example, the upper dielectric layer 280 may include any one of silicon oxide, silicon nitride, or silicon oxynitride. On the other hand, the upper dielectric layer 280 may be formed of an organic insulating material. For example, the upper dielectric layer 280 may include an organic insulating material containing benzocyclobutene and acryl-based resin.

The pixel electrode 290 may be disposed on the upper dielectric layer 280, and may be formed in the contact hole 282 for contacting the source electrode 274. The pixel electrode 290 may include a transparent conductive material. For example, the pixel electrode 290 may include indium tin oxide or indium zinc oxide.

According to an embodiment of the inventive concept, the common voltage line ICcom may include the first interconnection pattern 236 that is provided in the same process as a process which forms the gate electrode 232 of the transistor T and the lower electrode 234 of the storage capacitor Cst, the second interconnection pattern 256 that is provided in the same process as a process which forms the upper electrode 252 of the storage capacitor Cst, and the third interconnection pattern 276 and plug 278 that are provided in the same process as a process which forms the drain electrode 272 and the source electrode 274. Therefore, the resistance of the common voltage line ICcom decreases, and thus the surface noise of the liquid crystal display device can be reduced. Accordingly, when a touch panel is mounted on the liquid crystal display device according to an embodiment of the inventive concept, a malfunction in the touch panel can be minimized due to the surface noise of the liquid crystal display device. As a result, the liquid crystal display device having high reliability and high efficiency can be provided.

Figure 5A:
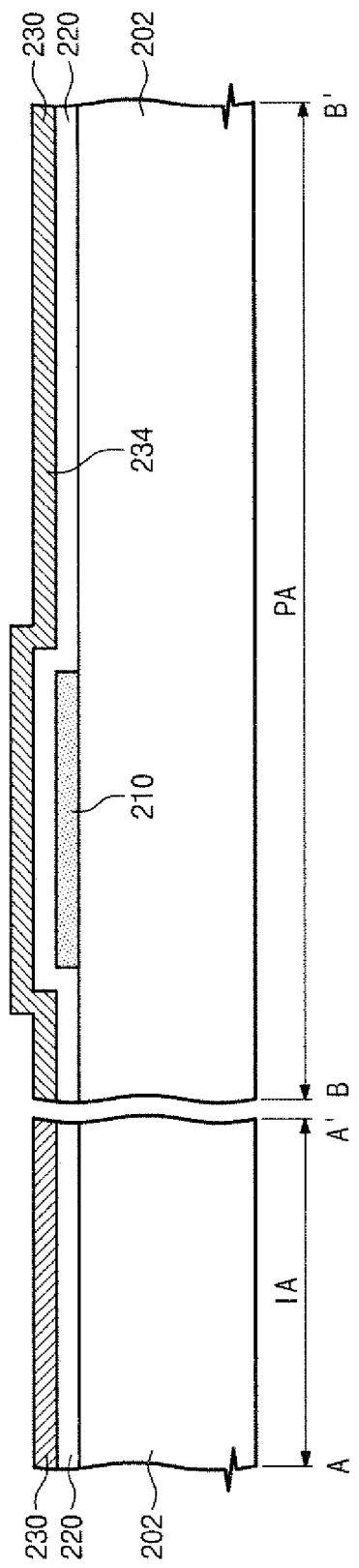
Figure 5B:
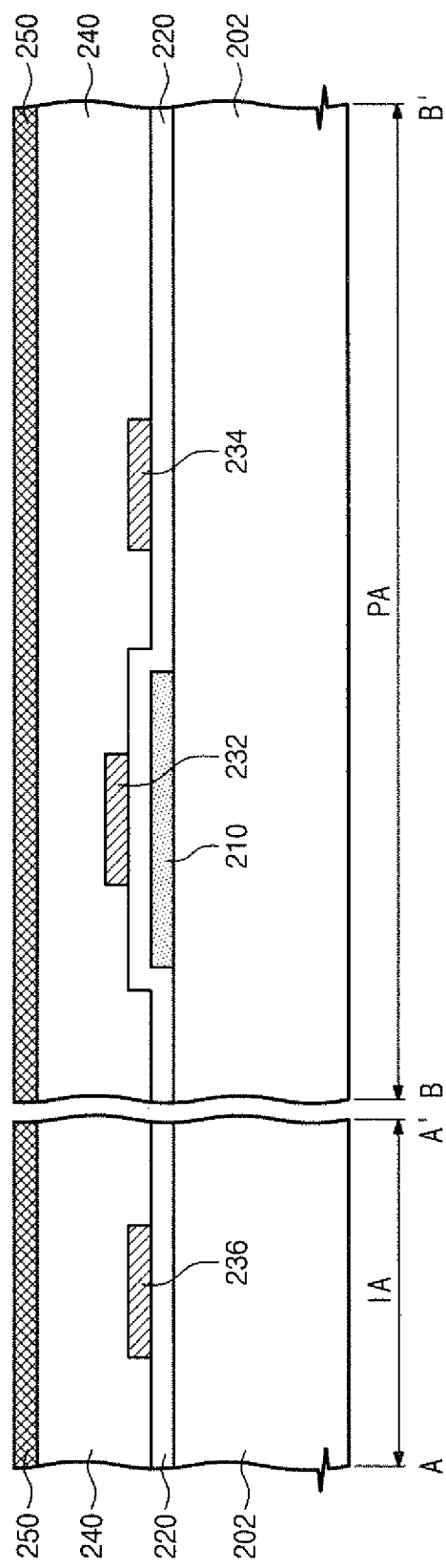

The following description will be made on a method of manufacturing a common voltage line which is included in a liquid crystal display device of FIG. 4 according to the embodiment of the inventive concept. FIGS. 5A to 5C are cross-sectional views illustrating a method of manufacturing a common voltage line which is included in a liquid crystal display device according to the embodiment of the inventive concept.

Referring to FIG. 5A, prepared is a substrate 202 including a pixel area PA and an interconnection area IA. The substrate 202 may be formed of an insulating material. For example, the substrate 202 may be formed of a glass, quartz or plastic.

The semiconductor pattern 210 may be formed on the substrate 202 in the pixel area PA. The semiconductor pattern 210 may be formed by forming a semiconductor layer over the substrate 202 and patterning the semiconductor layer. The semiconductor layer may be formed of poly-crystal silicon that is formed by forming amorphous silicon on the substrate 202 and performing a crystallization process for the amorphous silicon. For example, the crystallization process may include any one of an Eximer Laser Annealing (ELA) process, a Sequential Lateral Solidification (SLS) process or a Super Grain Silicon (SGS) process.

Subsequently, an insulation layer 220 covering the semiconductor pattern 210 may be formed over the substrate 202, and an overlying conductive layer 230 may be formed on the insulation layer 220. The overlying conductive layer 230 may include at least one of Mo, Al, Ag, Cu, Cr, Ti or Ta.

Referring to FIG. 5B, by patterning the overlying conductive layer 230, a gate electrode 232 and a lower electrode 234 may be formed in the pixel area PA, and a first interconnection pattern 236 may be formed in the interconnection area IA. The gate electrode 232 may be formed to overlap with the semiconductor pattern 210, and the lower electrode 234 may be formed to be separated sideward from the gate electrode 232.

A lower dielectric layer 240 that covers the gate electrode 232, the lower electrode 234 and the first interconnection pattern 236 may be formed on the insulation layer 220. The lower dielectric layer 240 may be a multi-layer.

A first conductive layer 250 may be formed on the lower dielectric layer 240. The first conductive layer 250 may include the same material as that of the overlying conductive layer 230.

Referring to FIG. 5C, the first conductive layer 250 is patterned, and thus an upper electrode 252 overlapping with the lower electrode 234 and a second interconnection pattern 256 overlapping with the first interconnection pattern 236 may be formed.

An interconnection area contact hole 244 and pixel area contact holes 242 may be formed by patterning the second interconnection pattern 256, and then patterning the lower dielectric layer 240 in the interconnection area IA between the first and second interconnection patterns 236 and 256 and in the pixel area PA over the semiconductor patter 210. The pixel area contact holes 242 may expose the semiconductor pattern 210 of both sides of the gate electrode 232. The interconnection area contact hole 244 may expose the first interconnection pattern 236.

The pixel area contact holes 242 and the interconnection area contact hole 244 are formed, and thereafter a second conductive layer 270 may be formed on the lower dielectric layer 240. The second conductive layer 270 may cover the second interconnection pattern 256 and the upper electrode 252, partially fill the pixel area contact holes 242 and fill the interconnection area contact hole 244. For example, the second conductive layer 270 may completely fill the interconnection area contact hole 244 and be conformally formed in the pixel area contact holes 242. Therefore, an internal space surrounded by the second conductive layer 270 may be formed in the pixel area contact holes 242. The second conductive layer 270 may include a material different from that of the underlying and first conductive layers 230 and 250 that have been described above with reference to FIGS. 5A and 5B.

Referring again to FIG. 4, the second conductive layer 270 of FIG. 5C is patterned, and thus a drain electrode 272, a source electrode 274, a contact plug 278 and a third interconnection pattern 276 may be formed. The source electrode 274 may contact the upper electrode 252. The third interconnection pattern 276 may overlap with and directly contact the second interconnection pattern 256.

An upper dielectric layer 280 may be formed on the lower dielectric layer 240. A contact hole 282 for exposing the source electrode 274 may be formed through the upper dielectric layer 280. A pixel electrode 290 may be formed on the upper dielectric layer 280. The pixel electrode 290 may be formed in the contact hole 282 that exposes the source electrode 274, thereby contacting the source electrode 274.

The following description will be made on a modification example of a common voltage line which is included in an liquid crystal display device according to an embodiment of the inventive concept.

Figure 6:
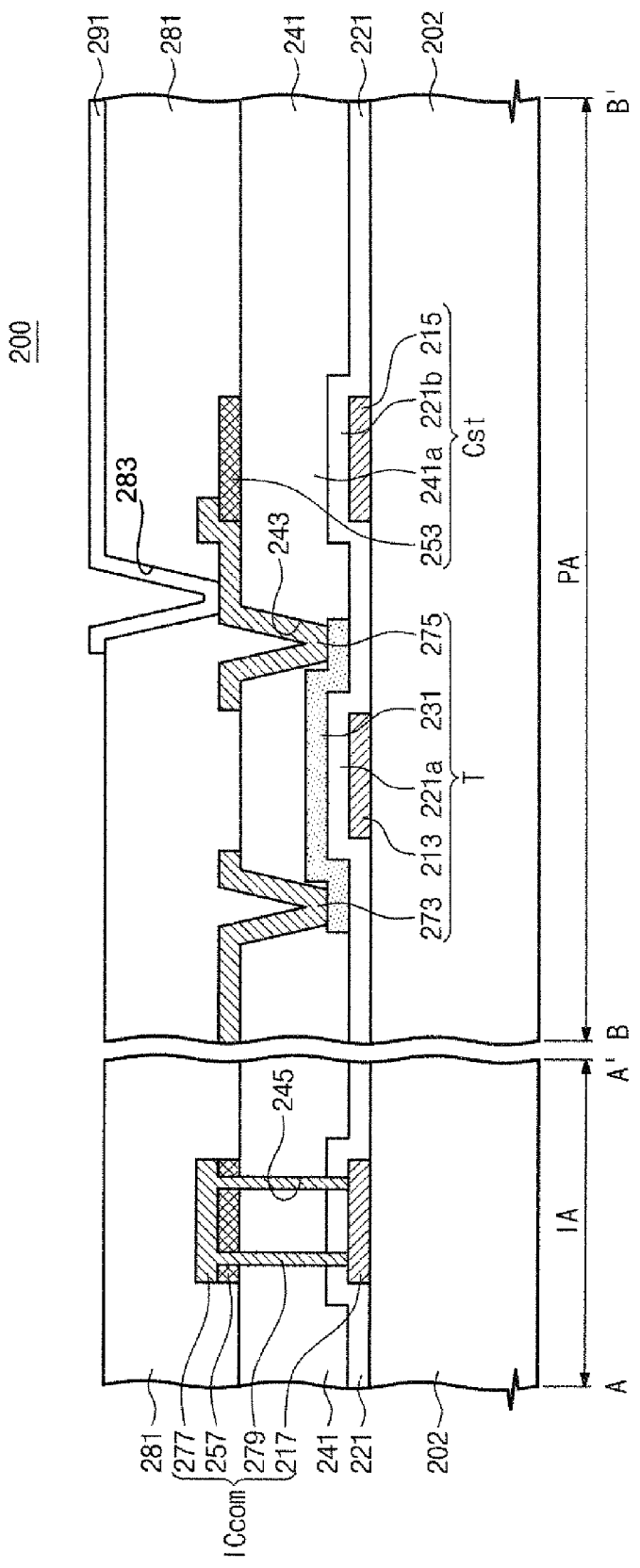
FIG. 6 is a cross-sectional view illustrating a modification example of a common voltage line which is included in a liquid crystal display device according to an embodiment of the inventive concept.

FIG. 6 is a cross-sectional view illustrating a modification example of a common voltage line which is included in an liquid crystal display device according to an embodiment of the inventive concept.

Referring to FIG. 6, like the above description that has been made with reference to FIG. 4, prepared is a substrate 202 including a pixel area PA and an interconnection area IA. The transistor T, the storage capacitor Cst and the pixel electrode 290 that are included in the each pixel cell 145 of FIG. 2 may be formed in the pixel area PA, and the common voltage line ICcom may be formed in the interconnection area IA.

The transistor T may include a gate electrode 213 on the substrate 202, a gate dielectric 221a on the gate electrode 213, a semiconductor pattern 231 on the gate dielectric 221a, a drain electrode 273, and a source electrode 275. Herein, the drain electrode 273 and the source electrode 275 may be in contact with the semiconductor pattern 231 in both sides of the gate electrode 213.

The storage capacitor Cst may include a lower electrode 215 on the substrate 202, an upper electrode 253 over the lower electrode 215, and a capacitor dielectric layer 221b and 241a between the lower electrode 215 and the upper electrode 253.

The common voltage line ICcom may include first, second and third interconnection patterns 217, 257 and 277 that are sequentially stacked over the substrate 202, and contact plugs 279 connecting the first and second interconnection patterns 217 and 257.

The gate electrode 213 and the lower electrode 215 that is separated laterally from the gate electrode 213 may be disposed on the substrate 202 of the pixel area PA. The first interconnection pattern 217 may be disposed on the substrate 202 of the interconnection area IA. The gate electrode 213, the lower electrode 215 and the first interconnection pattern 217 may be formed of the same material. The gate electrode 213, the lower electrode 215 and the first interconnection pattern 217 may be provided in the same process. Therefore, the gate electrode 213, the lower electrode 215 and the first interconnection pattern 217 may have the same thickness. The gate electrode 213, the lower electrode 215 and the first interconnection pattern 217 may be disposed at the substantially same level from the top of the substrate 202. The gate electrode 213, the lower electrode 215 and the first interconnection pattern 217 may be formed of the same material as that of the gate electrode 232, lower electrode 234 and first interconnection pattern 236 described above with reference to FIG. 4.

An insulation layer 221 may be disposed over the substrate 202. The insulation layer 221 may cover the gate electrode 213, the lower electrode 215 and the first interconnection pattern 217. The insulation layer 221 may be formed of the same material as that of the insulation layer 220 described above with reference to FIG. 4.

The semiconductor pattern 231 overlapping with the gate electrode 213 may be disposed on the insulation layer 221 of the pixel area PA. The semiconductor pattern 231 may not overlap with the lower electrode 215. The semiconductor pattern 231 may include the same material as that of the semiconductor pattern 210 described above with reference to FIG. 4. The insulation layer 221 between the semiconductor pattern 231 and the gate electrode 213 may be defined as the gate dielectric 221a.

A lower dielectric layer 241 may be disposed to cover the semiconductor pattern 231 and the insulation layer 221. The lower dielectric layer 241 may include the same material as that of the lower dielectric layer 240 described above with reference to FIG. 4. The lower dielectric layer 241 may include pixel area contact holes 243 that expose the semiconductor pattern 231 of both sides of the gate electrode 213.

An upper electrode 253 overlapping with the lower electrode 215 and a second interconnection pattern 257 overlapping with the first interconnection pattern 217 may be disposed on the lower dielectric layer 241. The upper electrode 253 and the second interconnection pattern 257 may be formed of the same material. In this case, the upper electrode 253 and the second interconnection pattern 257 may be formed of the same material as that of the lower electrode 215 and first interconnection pattern 217. The upper electrode 253 and the second interconnection pattern 257 may be provided in the same process. Therefore, the upper electrode 253 and the second interconnection pattern 257 may have the same thickness. The upper electrode 253 and the second interconnection pattern 257 may be disposed at the substantially same level from the top of the substrate 202.

The drain electrode 273 and the source electrode 275 may be formed in the pixel area contact holes 243 and contact the semiconductor pattern 231 that is exposed by the pixel area contact holes 243. An internal space surrounded by the drain electrode 273 and the source electrode 275 may be defined in the pixel area contact holes 243. The source electrode 275 may contact the upper electrode 253.

The third interconnection pattern 277 overlapping with the second interconnection pattern 257 may be formed of the same material as that of the drain and source electrodes 273 and 275. The third interconnection pattern 277, the drain electrode 273 and the source electrode 275 may be formed of a material different from that of the first and second interconnection patterns 217 and 257, that of the upper and lower electrodes 253 and 215 and that of the gate electrode 213. The third interconnection pattern 277, the drain electrode 273 and the source electrode 275 may be formed of the same material as that of the third interconnection pattern 276, drain electrode 272 and source electrode 274 described above with reference to FIG. 4.

The contact plug 279 may fill an interconnection area contact hole 245 exposing the first interconnection pattern 217, through the second interconnection patterns 257 and the lower dielectric layer 240 between the first and second interconnection patterns 217 and 257. The contact plug 279 may electrically connect the first and second interconnection patterns 217 and 257. The contact plug 279 may be formed of the same material as that of the third interconnection pattern 277, drain electrode 273 and source electrode 275.

An upper dielectric layer 281 may be disposed on the lower dielectric layer 241, and a pixel electrode 291 contacting the source electrode 275 via contact hole 283 may be disposed on the upper dielectric layer 281.

The following description will be made on the modification example of a method of manufacturing a common voltage line which is included in a liquid crystal display device according to an embodiment of FIG. 6.

Figure 7A:
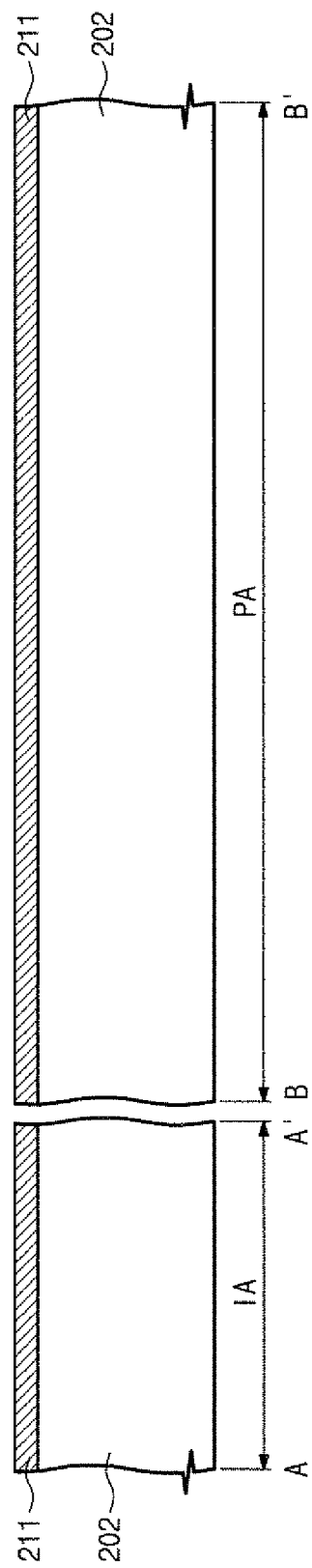
FIGS. 7A to 7C are cross-sectional views illustrating a modification example of a method of manufacturing a common voltage line which is included in a liquid crystal display device according to the embodiment of the inventive concept of FIG. 6.
Figure 7B:
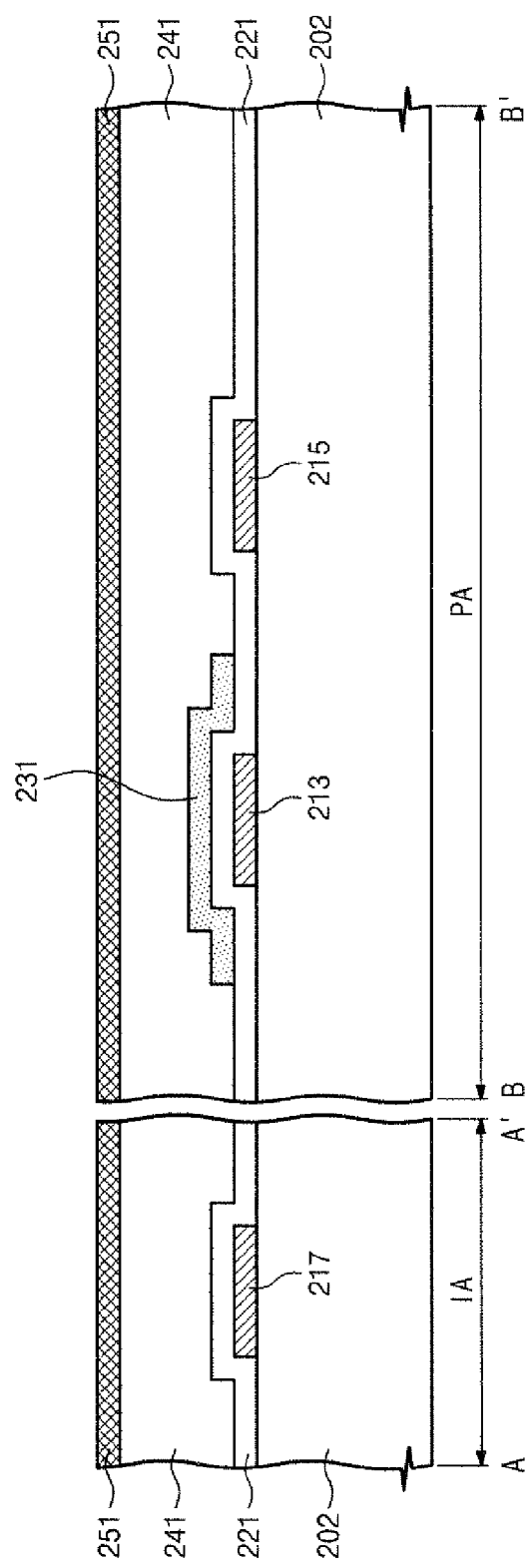
Figure 7C:
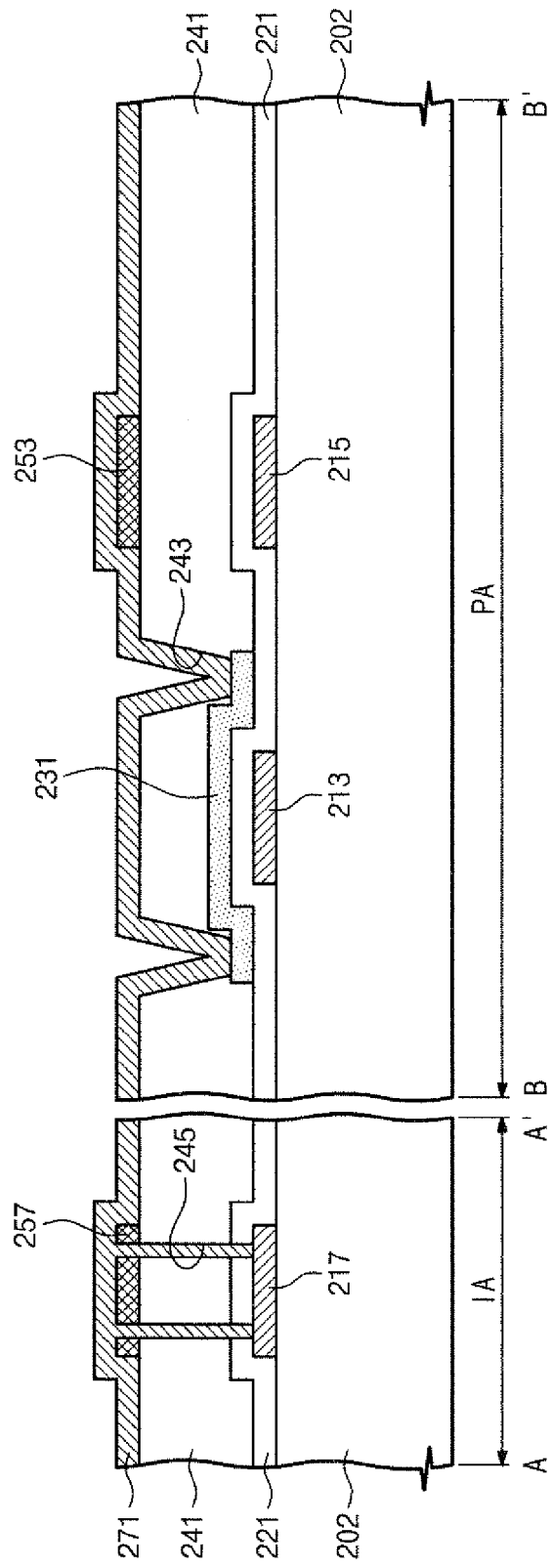

FIGS. 7A to 7C are cross-sectional views illustrating the modification example of a method of manufacturing a common voltage line which is included in a liquid crystal display device according to an embodiment of the inventive concept.

Referring to FIG. 7A, prepared is a substrate 202 including a pixel area PA and an interconnection area IA that are separated. The substrate 202 may be the same as the substrate 202 that has been described above with reference to FIG. 5A. An overlying conductive layer 211 may be formed over the substrate 202. The overlying conductive layer 211 may be include the same material as that of the overlying conductive layer 230 which has been described above with reference to FIG. 5A.

Referring to FIG. 7B, by patterning the overlying conductive layer 211, a gate electrode 213 and a lower electrode 215 that are laterally separated may be formed on the substrate 202 of the pixel area PA, and a first interconnection pattern 217 may be formed on the substrate 202 of the interconnection area IA. The overlying conductive layer 211 is patterned, and then an insulation layer 221 that covers the gate electrode 213, the lower electrode 215 and the first interconnection pattern 217 may be formed on the substrate 202.

A semiconductor pattern 231 may be formed on the insulation layer 221. The semiconductor pattern 231 may be formed to overlap with the gate electrode 213 and not to overlap with the lower electrode 215. The semiconductor pattern 231 may be formed in a similar process as that of the semiconductor pattern 210 that has been described above with reference to FIG. 5A.

The semiconductor pattern 231 is formed, and then a lower dielectric layer 241 may be formed over the semiconductor pattern 231 and on insulation layer 221. A first conductive layer 251 may then be formed on the lower dielectric layer 241. The first conductive layer 251 may be formed of the same material as that of the overlying conductive layer 211.

Referring to FIG. 7C, the first conductive layer 251 is patterned, and thus an upper electrode 253 overlapping with the lower electrode 215 and a second interconnection pattern 257 overlapping with the first interconnection pattern 217 may be formed.

Pixel area contact holes 243 and an interconnection area contact hole 245 may be formed by patterning the lower dielectric layer 241 in the pixel area PA, the lower dielectric layer 241 between the first and second interconnection patterns 217 and 257, and the second interconnection pattern 257. The pixel area contact holes 243 may expose the semiconductor pattern 231 of both sides of the gate electrode 213. The interconnection area contact hole 245 may expose the first interconnection pattern 217.

The pixel area contact holes 243 and the interconnection area contact hole 245 are formed, and thereafter a second conductive layer 271 may be formed on the lower dielectric layer 241. The second conductive layer 271 may cover the second interconnection pattern 257 and the upper electrode 253, and fill the pixel area contact holes 243 and the interconnection area contact hole 245. For example, the second conductive layer 271 may completely fill the interconnection area contact hole 245 and be conformally formed in the pixel area contact holes 243. Therefore, an internal space surrounded by the second conductive layer 271 may be formed in the pixel area contact holes 243. The second conductive layer 271 may include a material different from that of the overlying layer 211 and first conductive layer 251 that have been described above with reference to FIGS. 7A and 7B.

Referring again to FIG. 6, the second conductive layer 271 is patterned, and thus a drain electrode 273, a source electrode 275, a contact plug 279 and a third interconnection pattern 277 may be formed. The source electrode 275 may contact the upper electrode 253. The third interconnection pattern 277 may overlap with and directly contact the second interconnection pattern 257.

An upper dielectric layer 281 may be formed on the lower dielectric layer 241. A contact hole for exposing the source electrode 275 may be formed through the upper dielectric layer 281. A pixel electrode 291 may be formed on the upper dielectric layer 281. The pixel electrode 291 may be formed in the contact hole 283 that exposes the source electrode 275, thereby contacting the source electrode 275.

According to the embodiments of the inventive concept, the pixel cells are provided on the substrate, and the common voltage line for supplying the common voltage to the pixels is provided on the substrate. Each of the pixel cells includes the lower electrode and the storage capacitor including the upper electrode over the lower electrode, the common voltage line includes the first to third interconnection patterns that are sequentially stacked on the substrate, and the second interconnection pattern is formed of the same material as that of the upper electrode in the same process. Accordingly, the resistance of the common voltage line is reduced, and thus provided can be the liquid crystal display device having high reliability and high efficiency.

The above-disclosed subject matter is to be considered illustrative and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. A liquid crystal display device comprising:
a plurality of pixel cells on a substrate; and
a common voltage line providing a common voltage to the pixel cells, the common voltage line comprising first, second and third interconnection patterns which are sequentially stacked over the substrate, wherein:
each of the pixel cells comprises a storage capacitor comprised of a lower electrode, and an upper electrode over the lower electrode, and
the second interconnection pattern comprises the same material as a material of the upper electrode, and the second interconnection pattern is formed in the same process as a process of forming the upper electrode.

2. The liquid crystal display device of claim 1, wherein the second interconnection pattern is disposed at the same level as a level of the upper electrode.

3. The liquid crystal display device of claim 1, wherein:
each pixel cell further comprises a transistor,
the transistor comprises a semiconductor pattern on the substrate, a gate electrode overlapping with the semiconductor pattern, a gate dielectric between the semiconductor pattern and the gate electrode, and a source electrode and a drain electrode which contact the semiconductor pattern of both sides of the gate electrode, and
the first interconnection pattern comprises the same material as a material of the gate electrode, and is formed in the same process as a process of forming the gate electrode.

4. The liquid crystal display device of claim 3, wherein the first interconnection pattern and the gate electrode are disposed at different levels.

5. The liquid crystal display device of claim 3, wherein the first interconnection pattern and the gate electrode are disposed at the same level.

6. The liquid crystal display device of claim 3, wherein the third interconnection pattern, the source electrode and the drain electrode are formed in the same process as a process of forming the third interconnection pattern.

7. The liquid crystal display device of claim 1, wherein the first interconnection pattern comprises the same material as a material of the lower electrode, and is formed in the same process as a process of forming the lower electrode.

8. The liquid crystal display device of claim 1, wherein the first interconnection pattern and the lower electrode are disposed at the same level.

9. The liquid crystal display device of claim 1, wherein:
the second and third interconnection patterns are directly contacted, and
the liquid crystal display device further comprises a dielectric layer between the first and second interconnection patterns.

10. The liquid crystal display device of claim 9, wherein the common voltage line further comprises a contact plug which connects the first and second interconnection patterns through the dielectric layer and the second interconnection pattern.

11. The liquid crystal display device of claim 1, wherein:
the first and second interconnection patterns comprise the same material, and
the first and second interconnection patterns comprise a different material from a material of the third interconnection pattern.

12. The liquid crystal display device of claim 1, wherein the common voltage line is disposed on an edge portion of the substrate and surrounds the pixel cells.

* * * * *